United States Patent
Fang et al.

(10) Patent No.: US 10,275,749 B2
(45) Date of Patent: Apr. 30, 2019

(54) TRACKING USE OF A VIRTUALIZATION SERVICE ACCORDING TO GLOBALIZATION CHARACTERISTIC BASED USAGE

(71) Applicant: INTERNATIONAL BUSINESS MACHINES CORPORATION, Armonk, NY (US)

(72) Inventors: Wu S. Fang, Beijing (CN); Su Liu, Austin, TX (US); Michael S. Ly, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 768 days.

(21) Appl. No.: 14/664,767

(22) Filed: Mar. 20, 2015

(65) Prior Publication Data

US 2016/0275467 A1  Sep. 22, 2016

(51) Int. Cl.
  *G06Q 20/14* (2012.01)
  *H04L 12/26* (2006.01)
  *H04L 29/08* (2006.01)

(52) U.S. Cl.
  CPC ....... *G06Q 20/145* (2013.01); *H04L 43/0876* (2013.01); *H04L 67/02* (2013.01); *H04L 67/10* (2013.01); *H04L 67/125* (2013.01); *H04L 67/16* (2013.01); *H04L 67/22* (2013.01)

(58) Field of Classification Search
  CPC .................................................. G06Q 20/145
  See application file for complete search history.

(56) References Cited

U.S. PATENT DOCUMENTS

| 8,347,306 B2 * | 1/2013 | Li .................... G06Q 10/06 709/224 |
| 8,356,274 B2 | 1/2013 | Kwok et al. |
| 8,504,689 B2 | 8/2013 | Ferris et al. |
| 8,521,777 B2 | 8/2013 | Nuggehalli et al. |

(Continued)

FOREIGN PATENT DOCUMENTS

EP   2390784 A1   11/2011

OTHER PUBLICATIONS

IBM, "Method and Apparatus for Optimized SaaS Customization Request Analysis", IPOM000190600D, Dec. 8, 2009, 8 pages.

(Continued)

*Primary Examiner* — Eric T Wong
(74) *Attorney, Agent, or Firm* — Amy J. Pattillo; Joseph Petrokaitis

(57) ABSTRACT

Tracking of data processing usage of a workload is initiated, within a virtualized environment, comprising one or more globalization characteristics, wherein the at least one globalization characteristic requires conversion by at least one globalization service managed by a virtualization service provider of the virtualized environment. The at least one globalization characteristic is detected. At least one usage metric of the data is tracked during data processing of the workload request. The globalization usage data is output comprising an identifier for the at least one application, an identifier for the at least one globalization characteristic, and the at least one usage metric to identify a particular amount of overhead during data processing based on the at least one globalization characteristic.

11 Claims, 8 Drawing Sheets

(56) References Cited

U.S. PATENT DOCUMENTS

| | | | |
|---|---|---|---|
| 8,539,078 B2 | 9/2013 | Duan et al. | |
| 8,621,058 B2 | 12/2013 | Eswaran et al. | |
| 8,704,687 B2* | 4/2014 | Clissold | H03M 7/02 |
| | | | 341/106 |
| 9,202,239 B2* | 12/2015 | Van Biljon | G06Q 30/04 |
| 10,013,662 B2* | 7/2018 | Brandwine | G06Q 10/06312 |
| 2009/0271324 A1* | 10/2009 | Jandhyala | G06Q 10/06375 |
| | | | 705/80 |
| 2010/0250712 A1* | 9/2010 | Ellison | H04L 41/0233 |
| | | | 709/219 |
| 2011/0055034 A1* | 3/2011 | Ferris | G06Q 30/0283 |
| | | | 705/26.1 |
| 2011/0055378 A1* | 3/2011 | Ferris | G06F 11/3409 |
| | | | 709/224 |
| 2011/0144972 A1* | 6/2011 | Koenig | G06F 9/4448 |
| | | | 704/2 |
| 2011/0213687 A1* | 9/2011 | Ferris | G06Q 30/04 |
| | | | 705/34 |
| 2011/0271278 A1* | 11/2011 | Dittrich | G06F 8/60 |
| | | | 718/1 |
| 2011/0313896 A1* | 12/2011 | Nuggehalli | G06K 9/00993 |
| | | | 705/30 |
| 2011/0313902 A1 | 12/2011 | Liu et al. | |
| 2012/0084113 A1* | 4/2012 | Brandwine | G06Q 10/06312 |
| | | | 705/7.22 |
| 2012/0110462 A1 | 5/2012 | Eswaran et al. | |
| 2012/0131174 A1* | 5/2012 | Ferris | G06F 9/5072 |
| | | | 709/224 |
| 2012/0185236 A1* | 7/2012 | Blodgett | G06F 17/289 |
| | | | 704/2 |
| 2012/0203908 A1 | 8/2012 | Beaty et al. | |
| 2012/0204169 A1 | 8/2012 | Breiter et al. | |
| 2012/0204187 A1 | 8/2012 | Breiter et al. | |
| 2012/0311153 A1 | 12/2012 | Morgan | |
| 2013/0019015 A1 | 1/2013 | Devarakonda et al. | |
| 2013/0185413 A1* | 7/2013 | Beaty | G06F 9/5072 |
| | | | 709/224 |
| 2014/0032531 A1* | 1/2014 | Ravi | G06F 17/30554 |
| | | | 707/722 |

OTHER PUBLICATIONS

"Method to Automate and Personalize/Configure a System for deploying the System into a Specific Landscape/Software-As-A-Service (Saas) Solution Instance", IPOM000198383D, Aug. 6, 2010, 5 pages.

"IBM Platform Resource Scheduler", available from <http://www-03.ibm.com/systems/platformcomputing/products/rs/> as of Mar. 17, 2015, 3 pages.

Disclosed Anonymously, Method for High Fidelity Measurement of Per VM CPU and Energy Consumption, IP.com, IPCOM000216642D, Apr. 11, 2012.

U.S. Appl. No. 14/731,406, filed Jun. 5, 2015, In re Fang, 49 pages.

"List of IBM Patents or Patent Applications Treated as Related", 2 pages.

USPTO Office Actino, daed Oct. 16, 2018, In re Fang, U.S. Appl. No. 14/713,406, filed Jun. 5, 2015, 22 pages.

* cited by examiner

| LANG | CODE SET | OS INSTANCE 1 ||||||  OS INSTANCE 2 ||||||
|---|---|---|---|---|---|---|---|---|---|---|---|---|---|
| | | APPLICATION 1 ||| APPLICATION 2 ||| APPLICATION 1 ||| APPLICATION 2 |||
| | | APP HRS | IN GB | OUT GB | APP HRS | IN GB | OUT GB | APP HRS | IN GB | OUT GB | APP HRS | IN GB | OUT GB |
| LANG A | SET A | 30 | 60 | 72 | 50 | 100 | 120 | 60 | 120 | 144 | 10 | 20 | 24 |
| | SET B | 20 | 40 | 48 | 45 | 90 | 108 | 70 | 140 | 168 | 20 | 40 | 48 |
| | SET C | 15 | 30 | 36 | 23 | 46 | 55 | 80 | 160 | 192 | 30 | 60 | 72 |
| LANG B | SET D | 40 | 80 | 96 | 80 | 160 | 192 | 50 | 100 | 120 | 40 | 80 | 96 |
| | SET E | 10 | 20 | 24 | 100 | 200 | 240 | 30 | 60 | 72 | 50 | 100 | 012 |
| | SET B | 10 | 20 | 24 | 5 | 10 | 12 | 40 | 80 | 96 | 80 | 160 | 192 |
| LANG C | SET F | 75 | 150 | 180 | 30 | 60 | 72 | 20 | 40 | 48 | 40 | 80 | 96 |
| | SET B | 20 | 40 | 48 | 25 | 50 | 60 | 10 | 20 | 24 | 60 | 120 | 144 |

*FIG. 4*

TRACKING USE OF A VIRTUALIZATION SERVICE ACCORDING TO GLOBALIZATION CHARACTERISTIC BASED USAGE

TECHNICAL FIELD

The embodiment of the invention relates generally to data processing and particularly to tracking use of a virtualization service according to globalization characteristic based usage.

DESCRIPTION OF THE RELATED ART

Service providers that provide customers with a virtualization service provide a service that allow customers to use virtualized hardware, software, and network resources within virtualized environments, where one or more of the underlying application, platform, and infrastructure resources are invisible to the customers. In one example, in a cloud computing environment, Software as a Service (SaaS) represents one service model for SaaS service providers to use to deliver a virtualization service allowing customer access to virtualized application resources, under a "pay as you go" model, where customers are billed for application resource use as the application resources are accessed and used.

BRIEF SUMMARY

Different customers may require different customizations of the services provided to customers by service providers of virtualization services. Customers requesting service from virtualization service providers may use different globalization characteristics in their use of computing resources. Globalization characteristics may include, but are not limited to, language, cultural conventions and code set selections by customers. A customer may request that virtualization service providers provide service customized for the globalization characteristics used by that customer, however, the customization of application service for the globalization characteristics may be handled by the virtualization service and transparent to the user. The data processing use required for each type of globalization characteristic varies. Therefore, there is a need for a method, system, and computer program product for tracking use of a virtualization service according to globalization characteristic based usage.

In another embodiment, a system for dynamically tracking usage of a virtualized environment comprises a processor, coupled with a memory. The processor is configured to perform the actions of receiving, at a virtualization service, a plurality of workloads, each of the plurality of workloads received comprising separate at least one globalization characteristics from among a plurality of globalization characteristics comprising language, cultural conventions, and code set conventions, each of the plurality of workloads received from a separate user from among a plurality of users associated with a particular account. The processor is configured to perform the actions of initiating tracking, by a billing service of the virtualization service, of data processing usage for the plurality of workloads submitted under the particular account, by tracking an overall usage metric of at least one virtualized environment comprising at least one application of a plurality of applications operating on an operating system layer hosted on at least one platform from among a plurality of virtualized environments. The processor is configured to perform the actions of, during data processing of each workload within the at least one virtual environment, converting at the operating system layer the separate at least one globalization characteristic by at least one globalization service of a plurality of globalization services managed by a virtualization service provider of the plurality of virtualized environments, each of the plurality of globalization services requiring a separate amount of overhead during data processing based on a type of globalization characteristic, each of the plurality of globalization characteristics requiring separate amounts of computing resources within the at least one virtualized environment. The processor is configured to perform the actions of tracking, by a globalization meter service operating at the operating system layer, a separate globalization usage metric of the separate amount of overhead of the globalization service and at least one particular globalization characteristic processed the data during data processing of each of the plurality of workloads. The processor is configured to perform the actions of reporting, by the globalization meter service to the billing service, the separate globalization usage metric tracked for each of the plurality of workloads. The processor is configured to perform the actions of outputting, by the billing service, a bill for the particular account based on the overall usage metric for the particular account and separately identifying the separate globalization usage metric for each of the plurality of workloads to identify the separate amount of overhead during data processing per workload based on the at least one particular globalization characteristic processed.

In another embodiment, a computer program product for tracking usage of a virtualized environment comprises a computer readable storage medium having program instructions embodied therewith. The program instructions are executable by a processor to cause the processor to receive, at a virtualization service, a plurality of workloads, each of the plurality of workloads received comprising separate at least one globalization characteristics from among a plurality of globalization characteristics comprising language, cultural conventions, and code set conventions, each of the plurality of workloads received from a separate user from among a plurality of users associated with a particular account. The program instructions are executable by a processor to cause the processor to initiate tracking, by a billing service of the virtualization service, of data processing usage for the plurality of workloads submitted under the particular account, by tracking an overall usage metric of at least one virtualized environment comprising at least one application of a plurality of applications operating on an operating system layer hosted on at least one platform from among a plurality of virtualized environments. The program instructions are executable by a processor to cause the processor to, during data processing of each workload within the at least one virtual environment, convert at the operating system layer the separate at least one globalization characteristic by at least one globalization service of a plurality of globalization services managed by a virtualization service provider of the plurality of virtualized environments, each of the plurality of globalization services requiring a separate amount of overhead during data processing based on a type of globalization characteristic, each of the plurality of globalization characteristics requiring separate amounts of computing resources within the at least one virtualized environment. The program instructions are executable by a processor to cause the processor to track, by a globalization meter service operating at the operating system layer, a separate globalization usage metric of the separate amount of overhead of the globalization service and at least one particular globalization characteristic processed during data processing of each of the plurality of workloads. The program instructions are executable by a processor to cause the processor to report, by the globalization meter service to the billing service, the separate globalization usage metric tracked for each of the plurality of workloads. The program instructions are executable by a processor to cause the processor to output, by the billing service, a bill for the particular account based on the overall usage metric for the particular account and separately identifying the separate globalization usage metric for each of the plurality of workloads to identify the separate amount of overhead during data processing per workload based on the at least one particular globalization characteristic processed.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 4 illustrates one example of a block diagram of a globalization usage table including a matrix of the globalization data processing usage metrics with the time and data usage specified for each globalization characteristic tracked during a particular time period;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
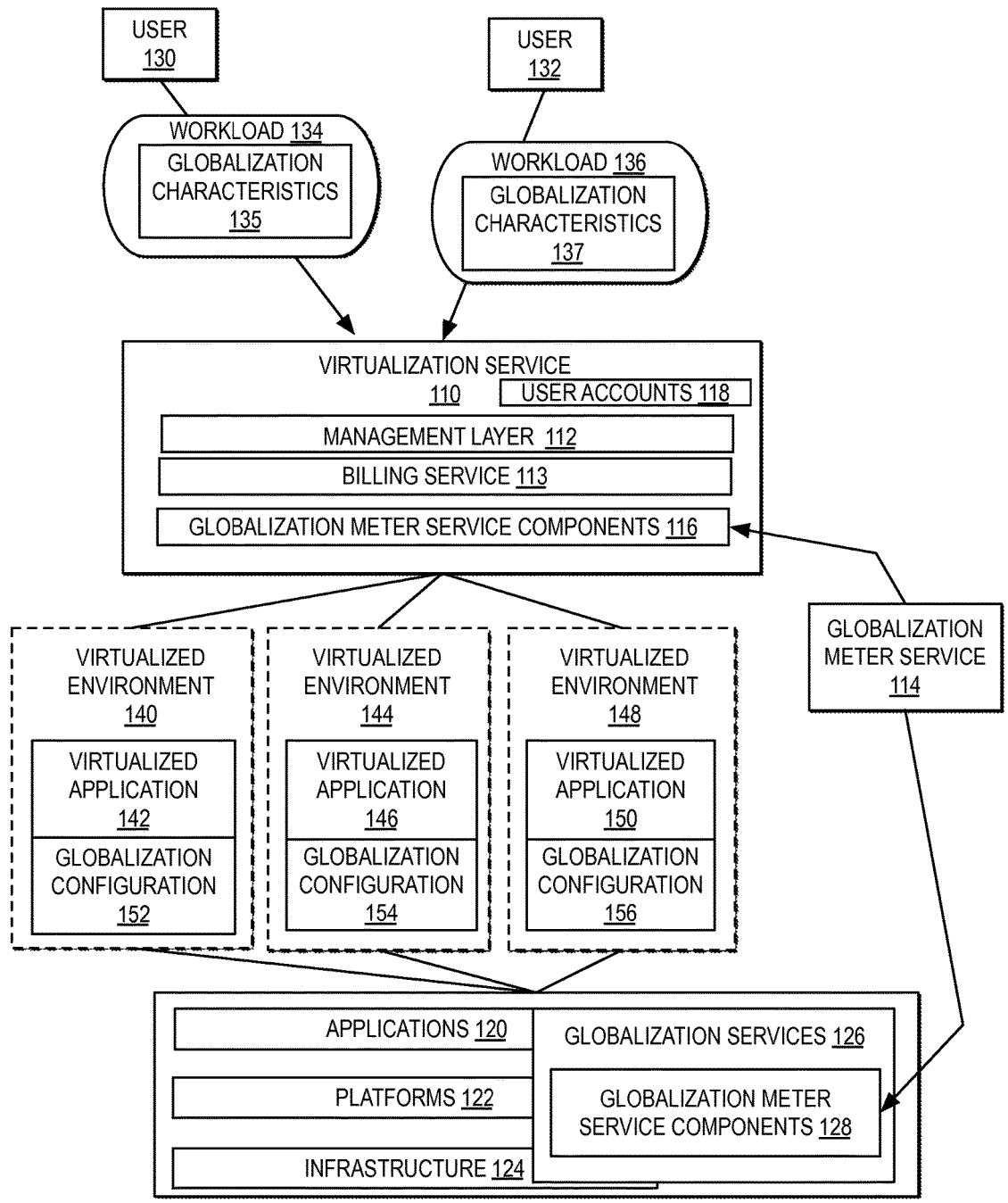
FIG. 1 illustrates one example of block diagram of a virtualization service implementing a globalization meter service for tracking use of the virtualization service according to globalization characteristic based usage.

FIG. 1 illustrates a block diagram of one example of a virtualization service implementing a globalization meter service for tracking use of the virtualization service according to globalization characteristic based usage.

In one example, one or more users may submit workloads to one or more virtualization services, such as virtualization service 110, through one or more network layer connections, to access one or more services provided by virtualization service 110. For example, a user 130 may submit one or more workloads, such as workload 134, to virtualization service 110 and a user 132 may submit one or more workloads, such as a workload 136, to virtualization service 110. In one example, each of workload 134 and workload 136 may represent one or more tasks, requests, data, modules, objects, or other elements that may be communicated between users and virtualization service 110 via one or more network connectivity layers. Each of user 130 and user 132 may send multiple workloads to virtualization service 110. While the example is illustrated with user 130 and user 132 sending workloads to virtualization service 110, in additional or alternate examples, a single user, additional users, or alternate users may send workloads to virtualization service 110. In one example, user 130 and user 132 may represent a single customer or multiple customers.

In one example, virtualization service 110 may represent a service or other type of component for managing access by users to virtualized selections of one or more applications 120, supported on one or more platforms 122, implemented within one or more types of infrastructure 124 through one or more virtualized environments. In one example, infrastructure 124 may include one or more infrastructure components including, but not limited to, virtual machines, hardware, software, servers, storage, load balancers and other virtual or physical resources. In one example, platforms 122 may include, but are not limited to, operating system layers, execution runtime control, database layers, web servers, middleware layers, and network support layers. Infrastructure 124 and platforms 122 may each be configured to perform one or more types of tasks including, but not limited to, system maintenance, backup, resiliency planning and globalization services.

In one example, virtualization service 110 may support access by users to one or more applications 120, support on one or more platforms 122, implemented within one or more types of infrastructure 124 based on one or more types of service models that deliver access to virtualized resources through one or more virtualized environments. Examples of service models supported by virtualization service 110 may include, but are not limited to, software as a service (SaaS), platform as a service (PaaS), and infrastructure as a service (IaaS). In one example a single service provider may provide a combination of two or more of PaaS, SaaS, and IaaS, along with additional virtualization and network services.

In one example, SaaS may represent a virtualized software service for providing users with access to application software and databases of applications 120. In one example, SaaS providers may manage platform 122 and infrastructure 124 that run applications 120; users do not manage the platform 122 and infrastructure 124 where applications 120 run, therefore users do not need to install and run applications 120 on the user's computers. SaaS may be a convenient service for use by users because the user may access an application on any computing device with an application interface, which may be provided in a browser window, and network connectivity to access virtualization service 110, without the user needing to install or maintain the application on the computing device and without the user needing to devote the underlying platform and infrastructure resources from the computing device to run the application. SaaS providers may implement a software licensing and use model in which applications 120 are centrally hosted in a cloud and a user may access and use applications 120 through a cloud client from the central host on a subscription basis. In one example, applications 120, when provided as virtualized applications or cloud applications, may consist of a selection of interrelated tasks, and configuration files, which contain dynamic information about the tasks at run time. The tasks of a virtualized application or cloud application may be cloned into multiple virtual machines, and accessible within one or more virtualized environments, and may also be removed from a virtual machine, to match workload demand.

In one example, PaaS may represent a service that delivers platform 122 as a computing platform, which may include one or more platform components such as, but not limited to, operating system, programming language, execution environment, database, and web server, and allows users to develop, run and manage applications 120 on platform 122 without the user needing to build and manage the underlying hardware and software layers of platform 122 and infrastructure 124 that may be required for developing and launching applications 120.

In one example, IaaS may represent a type of cloud computing in which a third-party provider hosts one or more physical or virtual computing resources over a network, on-demand from large pools installed in data centers, such as a service provider hosting one or more infrastructure components 124 on behalf of its users from a large data center. IaaS service providers may offer virtual machines managed by hypervisors, along with additional resources including, but not limited to, virtual machine disk image libraries, raw block storage, file or object storage, firewalls, load balancers, IP addresses, virtual local area networks (VLANs), and software bundles. IaaS providers may charge for IaaS services based on the amount of resources allocated and consumed.

In one example, virtualization service 110 may support user access to applications 120 through one or more virtualized environments, where each virtualized environment may represent a server partition of one or more virtualized applications, virtualized platform, and virtualized infrastructure resources from among applications 120, platforms 122, and infrastructure 124. In one example, multiple virtualized environments may be deployed for virtualization service 110, such as virtualized environment 140, virtualized environment 144, and virtualized environment 148. In one example, each of virtualized environment 140, virtualized environment 144, and virtualized environment 148 may represent one or more types of virtualized resources including, but not limited to, a virtual machine (VM), a logical partition (LPAR), and a workload partition (WPAR) of virtualized resources from among platforms 122 and infrastructure 124, loaded with one or more virtualized applications from among applications 120. In one example, a virtualized application may refer to a clone of the tasks and configuration files for an application. For example, virtualization service 110 may deliver access to one or more applications within applications 120 through virtualized environment 140 delivering access to a virtualized application 142, through virtualized environment 144 delivering access to a virtualized application 146, and through virtualized environment 148 delivering access to a virtualized application 150. In one example, each virtualized environment may be supported by a separate virtualized configuration from among platforms 122 and infrastructure 124. In one example, multiple virtualized environments may also share resources from among applications 120, platforms 122, and infrastructure 124. In one example, one user may access one or more virtualized environments. In addition, users may share access to a same virtualized environment. While virtualized environment 140, virtualized environment 144, and virtualized environment 148 are illustrated in the example, management layer 112 may manage additional or alternate partitions, where each partition supports an additional or alternate virtualized environment.

In one example, in supporting access by multiple users to applications 120 through one or more virtualized environments, virtualization service 110 may also need to provide customized access for each user to applications 120. To provide customized access for each user to applications 120 through one or more virtualized environments, virtualization service 110 may implement a management layer 112 to manage customized access for each user to applications 120. In one example, management layer 112 may manage metadata, user settings, and other information about each user in one or more layers, such as within management layer 112 as user accounts 118 and within one or more of the applications 120, platforms 122, and infrastructure 124 layers, to apply when customizing access for each user to applications 120. In addition, in one example, management layer 112 may detect current information, by user, in workload requests to dynamically apply when customizing access for each user to applications 120. Management layer 112 may also manage server partitioning and manage loading selected applications into each partition as a virtualized application to be accessed within a virtualized environment. The customization of service access by a user, at one or more of the application, platform, and infrastructure levels, may be transparent to each user. In one example, management layer 112 may be implemented within one or more layers of virtualization service 110 such as, but not limited to, a cloud management layer for managing a cloud service layer of virtualization service 110 or a partition management layer for managing server partitioning within virtualization server 110.

In one example, customized access for each user to applications 120 may require management of different globalization characteristics. Some of the tasks that applications 120, platforms 122, and infrastructure 124 perform may depend on the globalization characteristics of the data and workloads being handled. In one example, globalization characteristics may include, but are not limited to, language, cultural conventions and code set selections. For applications 120, platforms 122, and infrastructure 124 to support data processing and other functions for workloads, tasks, and data with different globalization characteristics, one or more layers of globalizations services 126 may be configured and implemented by one or more of applications 120, platforms 122 and infrastructure 124. Globalization services 126 may include, but are not limited to, globalization libraries, globalization settings, globalization modules, and globalization converters each identified for handling one or more types of globalization characteristics. Globalization services 126 may include files organized by locales or other globalization features. In one example, each locale may be specific to a particular language, culture, or territory, setting and may specify, for example, the name of the code set that the application data uses, the classification of the characters in the code set, the collation sequence to use of the character data, and the user format for monetary, numeric, date, time, and contact data. In addition, the types of files specified for a locale may include, for example, locale files that specify one or more of language, territory, writing direction and other cultural conventions, code set files that specify how to map each logical character in a character set to a unique bit pattern, code set conversion files that specify how to map each character in "source" code set to corresponding characters in a "target" code set, and a register files that associates code-set names and aliases with code-set numbers that specify file names of locale files and code set conversion files. In one example, code set files and code set conversion files may include characters specified according to one or more standards including, such as International Components for Unicode (ICU), globalization (GllN) libraries, and global language support (GLS). Globalization services 126 may also include services for managing globalization features of application usage and business model rules.

In one example, management layer 112 may manage customization of each virtualized application within each virtualized environment through a globalization configuration, specifying a selection of services from among globalization services 126, for each virtualized application to handle one or more globalization characteristics. For example, a globalization configuration 152 may be applied to virtualized application 142, a globalization configuration 154 may be applied to virtualized application 146, and a globalization configuration 156 may be applied to virtualized application 150.

In one example, virtualization service 110 may include a billing service 113 to monitor operations, meter usage of virtualization service 110, compute costs based on the metered usage, and allocate billing within accounts in user accounts 118. In one example, billing service 113 may meter usage according to one or more metrics in one or more layers of virtualization service 110, applications 120, platforms 122, and infrastructure 124. In addition, billing service 113 may receive usage metrics from other services in one or more layers of virtualization service 110, applications 120, platforms 122, and infrastructure 124. In one example, virtualization service 110 may represent a service provider entity that provides user access to applications 120, and the service provider may pay one or more additional entities for use of platforms 122 and infrastructure 124. In one example, billing service 113 may implement a default selection of rules for monitoring, metering, computing costs, and allocating billing, however, each of the these default rules may be modified, customized, and changed based on different user requirements, which may be specified in user accounts 118, and based on different business requirements, which may be specified by group rules, business rules, or other rules. In one example, virtualization service 110 may also allow users to select to customize the types of operations monitored, the types of metering usage data that is reported to the user, the types of metering usage data that are used as the basis for computing costs, the billing rates, and the type of information usage data reported to the user.

In one example, if virtualization service 110 provides globalization customization of each virtualized application within each virtualized environment through a globalization configuration, a factor that impacts the data processing overhead for each workload is the globalization characteristics of the workload. Data processing of workloads with different globalization characteristics requires different amounts of computing resources from among memory buffer sizes, CPU time, string formatting cost, and regular expression cost. For example, the memory buffer size consumption for data processing of a UTF-8 encoded message in a double-byte character set (DBCS) or multi-byte character set (MBCS) may be twice as much or more than the memory buffer size consumption for data processing of a UTF-8 encoded message in single-byte character set (SBCS). The amount of data processing overhead may be measured through one or more metrics including, but not limited to, time, data usage, application usage and other resource usage, required for data conversion and other services from among globalization services 126 and the data processing overhead measured may vary based on the type of globalization characteristic. The data processing overhead of each workload may be tied, in part or in whole, to the globalization characteristics of the workload.

In addition, differences in globalization characteristics may contribute to varying types of overheads and impact cost in additional ways. For example, where virtualization service 110 provides service globally, the resource cost to the service provider and the financial cost to the user for handling workloads with a globalization characteristic of a DBCS may be higher because there may be higher regional demands of workloads with a particular DBCS, leading to a larger balance of workloads with a higher data processing overhead on resources within a particular region. In one example, service providers may include surcharge rates that go into effect when the workload demands by a user in a region reach a threshold level, and users may trigger these rates more quickly if the user is sending workloads with a globalization characteristic with a higher data processing overhead. In another example, the cost of handling workloads with a particular globalization characteristic or originating from a region that typically includes a particular globalization characteristic may be higher if there is a tax charged to the service provider by another entity in association with the region or the globalization characteristic.

Generally, virtualization service 110 may allow users to select a metering basis for the user's account based on one or more of the amount of CPU usage per hour, the amount of application usage per hour, or the amount of data transmission per hour, to fit the user's business needs. If the service provider of virtualization service 110 pays one or more other entities for use of one or more of applications 120, platforms 122, and infrastructure 124 within virtualized environments, the selection of metering basis provided to the customer may be impacted by how the one or more other entities meter and charge the service provider for use of one or more of applications 120, platforms 122, and infrastructure 124. Given that different workloads may require different data processing overheads based on multiple factors, including the globalization characteristics of the workload, service providers and other entities may also need to track data processing metrics based on globalization characteristics of workloads in order to more accurately set billing rates in view of the differences in data processing overhead for different globalization characteristics.

In one example, if service providers are enabled to track data processing metrics based on globalization characteristics of workloads, service providers may select to set different pricing rates for different types and amounts of data processing. For example, in the example where buffer size consumption percentages are highest for workloads encoded in UTF-8 and a DBCS, service providers may set a higher price for CPU usage hours for workloads encoded in UTF-8 and DBCS than for CPU usage hours for workloads encoded in UTF-8 and a SBCS.

In addition, whether or not a service provider includes a billing model for setting billing rates in view of the differences in data processing overhead for different globalization characteristics, given that different workloads may require different data processing overheads based on globalization characteristics settings and given that users subscribe on a "pay as you go" basis, providing the user with the tracked data processing metrics based on globalization characteristics of workloads allows the user to monitor which workloads cost the most because of the increased data processing overhead for certain globalization characteristics. For example, an entity may create a customer account to host an application on virtualization service 110 and to allow access to a selected number of users, such as three users, to use the application, where the costs for usage by each user are added to the customer account. In one example, if the only cost metric provided to the entity is the total daily cost for usage by all the users, such as $30, the entity would not have information to determine whether the globalization characteristics for the workloads from any of the individual users impacted the cost per user. In contrast, if data processing metrics are tracked, based on globalization characteristics of workloads, and the metrics are provided to the entity, the entity may determine that because of the data processing overhead for use of a DBCS and a region tax added, the cost of a first user is $15, because of the data processing overhead for use of DBCS, the cost of a second user is $10, and because of the data processing overhead for use of a SBCS, the cost of a third user is $5. In one example, if the entity is able to assess the cost of workloads by user based on a globalization characteristics, the entity may assess whether other virtualization service providers are available who may have optimized service for data processing of the higher cost globalization characteristics for the first user and second user, to potentially decrease the cost of handling workloads from the first user and second user, and whether other virtualization service providers are available where taxation policies would not apply or would result in a reduced taxation rate.

In one example, to specifically track usage metrics of virtualization service 110 by each user based on globalization characteristics of workloads, a globalization meter service 114 may be implemented in one or more layers to track, accumulate, and distribute, usage metrics based on globalization characteristics of workloads and one or more components of globalization meter service 114 may be distributed in one or more layers. In one example, components of globalization meter service 114 may include, but are not limited to, one or more application programming interfaces (APIs), one or more agents, one or more controllers, and one or more data buffers, data records, data repositories, and data tables. In one example, globalization meter service components 116, which may represent one or more components of globalization meter service 114, may be implemented in virtualization service 110 and report usage metrics to billing service 113. In another example, globalization meter service components 128, which may represent one or more components of globalization meter service 114, may be implemented in one or more layers of applications 120, platforms 122, and infrastructure 124 and may be implemented with, or integrated into, one or more globalization services 126, and report usage metrics to globalization meter service components 116 or directly to billing service 113. In addition, each of globalization meter service components 116 and globalization meter service components 128 may output tracked usage metrics to other services or to storage locations accessible users and other services. In one example, billing service 113 may set billing rates for service use based on the globalization characteristic detected during data processing for the service.

In one example, in particular, one or more components of globalization meter service components 128 may be integrated at the application or operating system level, such as within applications 120 or platforms 122, to enable tracking of data processing metrics based on globalization characteristics of workloads at the application and operating system levels. In one example, at the application and operating system levels, data processing metrics can be tracked that include globalization data processing information based on the globalization characteristics handled for a workload. In contrast, in one example, globalization meter service components 116, at the virtualization service level, may only have access to data to track the amount of data transferred in and out of virtualization service, but not have access, within the virtualization service level alone, to data to track which globalization characteristics have been processed and usage metrics for data processing distinguished by globalization characteristics. In another embodiment, globalization meter service components 116 may have access to additional data to track the globalization characteristics associated with processed data.

In one example, one or more components from among globalization service meter components 128 may be integrated into existing libraries, APIs, and other modules within globalization services 126 such that one or more of globalization service meter components 128 may be called simply by calls to existing core I/O libraries and applications, in a transparent way. In particular, while existing libraries, APIs, and other modules within globalization services 126 may be modified to call an API component of globalization service meter components 128, other application, operating system, and other software elements do not need to be modified to trigger the tracking of globalization data processing metrics. In an additional or alternate embodiment, one or more components of globalization service meter components 128 may also be provided as stand alone components, not integrated into globalization services 126.

In one example, the data tracked by globalization meter service 114 may include, but is not limited to, identifiers for one or more of the globalization characteristics present in processed workloads, identifiers of the one or more globalization services required for processing workloads, identifiers for one or more OS instances, identifiers for one or more application instances used by a workload, and usage metrics such as an amount of time for data processing, an amount of inbound data for processing, and an amount of outbound data from processing. Additional usage metrics may include, but are not limited to, one or more metrics specifying usage of resources in a virtualized environment for processing a workload including, but not limited to, usage of infrastructure 124, usage of platforms 122, usage of applications 122, usage of globalization services 126, and usage of other services provided by virtualization service 110.

In one example, one or more of virtualization service 110, management layer 112, billing service 113, globalization meter service 114, globalization meter service components 116, virtualized environment 142, virtualized environment 144, virtualized environment 148, applications 120, platforms 122, infrastructure 124, globalization services 126, and globalization meter service components 128 are deployed or managed within a cloud environment.

Figure 2:
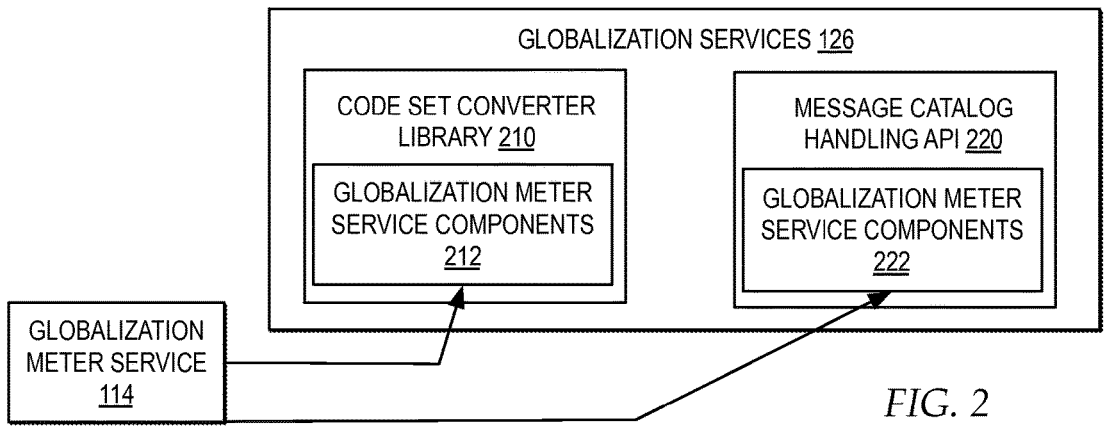
FIG. 2 illustrates one example of a block diagram of a globalization meter service integrated into a particular globalization service.

FIG. 2 illustrates one example of a block diagram of a globalization meter service integrated into a particular globalization service.

In one example, globalization services 126 may include a code set converter library 210. In one example, code set converter library 210 may represent libicov.a or iconvAPI, which are UNIX libraries for handling I/O operations, including converting different code sets from one code set to another code set. In another example, code set converter library 210 may represent application interfaces specified for one or more operating systems. In one example, globalization meter service 114 may be integrated into code set converter library 210 through globalization meter service components 212 to directly monitor I/O traffic information on a process and thread level and provide tracking of data processing overhead for code set conversion for different globalization characteristics.

In another example, globalization services 126 may include a message catalog handling API 220. In one example, message catalog handling API 220 may represent the catget API in AIX, which handles message translation and catalog management, and may include internationalization and localization operations. In one example, internationalization may refer to the operation by which a program is made aware of multiple languages. In one example, localization refers to the adaptation of a program a local language. In one example, globalization meter service 114 may be integrated into message catalog handling API 220 through globalization meter service components 222 to provide tracking of data processing overhead for message translation and catalog management for different globalization characteristics.

In one example, one or more of code set converter library 210 and message catalog handling API 220 may be integrated at an operating system level within platforms 122 to provide a transparent metering service. In one example, code set converter library 210 may call globalization meter service components 212 in a transparent way and message catalog handling API 220 may call globalization meter service components 222 in a transparent way. In one example, one or more of code set converter library 210 and message catalog handling API 220 may be integrated at other levels within applications 120, platforms 122, and infrastructure 124. In additional or alternate embodiments, globalization services 126 may include additional or alternate libraries and APIs.

Figure 3:
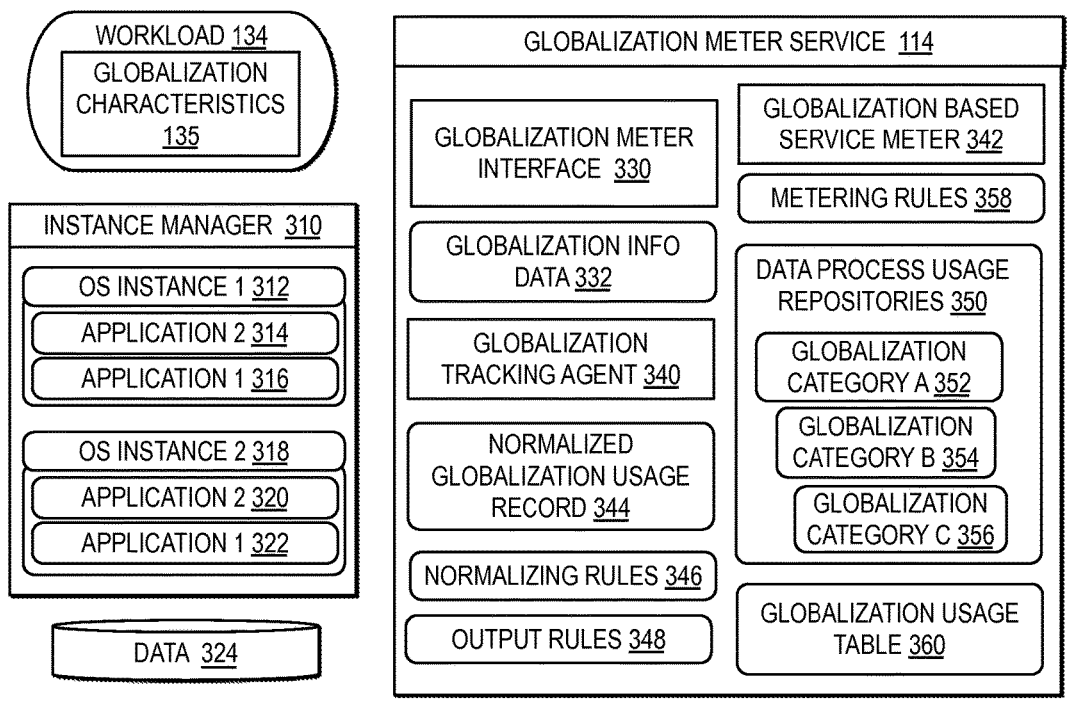
FIG. 3 illustrates one example of block diagram of a globalization meter service for tracking use of the virtualization service according to globalization characteristic based usage.

FIG. 3 illustrates one example of a block diagram of a globalization meter service for tracking use of the virtualization service according to globalization characteristic based usage.

In one example, globalization meter service 114 may include one or more components, including, but not limited to, a globalization meter interface 330, which may represent an application programming interface. In one example, globalization metering may be started by calling globalization meter interface 330. In one example, globalization meter interface 330 may get and track multiple types of globalization based data processing data and manage the data in a buffer. In one example, the buffered data is referred to as globalization info data 332.

In one example, globalization meter interface 330, as an application programming interface, may run for any application running in applications 120. By integrating globalization meter interface 330 into globalization services 126 at an operating system layer, globalization meter service 114 may be integrated into an existing virtualization environment and existing globalization services 126 running on an existing platform 122.

In one example, globalization meter interface 330 may be called when a session is opened to handle user workloads that require use of a specific application. In one example, management layer 112 may include one or more instance managers, such as instance manager 310, where each instance manager 310 manages which instance of a specific operating system or which instance of an application may be used for a session from among the virtualized application instances among virtualized environment 140, virtualized environment 144, and virtualized environment 148. In additional or alternate examples, instance manager 310 may be implemented in additional or alternate layers of virtualization service 110, applications 120, platforms 122, or infrastructure 124.

In one example, the one or more instance managers, such as instance manager 310 may manage one or more operating system instances or may manage one or more application instances for operation on one or more operating systems. In one example, each example of instance manager 310 may represent a cloud vendor for managing operating system instances or for managing application instances. For example, instance manager 310 may represent an operating system cloud vendor that manages an "OS instance 1" 312 and an "OS instance 2" 318, where multiple applications may be run on each OS instance as managed by another instance manager for another cloud vendor, by a user, or by another entity. As illustrated in the example, "application 1" 316 and "application 2" 314 may run on "OS instance 1" 312 and "application 1" 322 and "application 2" 320 may run on "OS instance 2" 318. In one example, a first user may rent and pay for an OS platform from an OS cloud vendor through virtualization service 110, where the rented OS platform is delivered through a virtualized environment including one of the OS instances managed by instance manager 310. In another example, not illustrated, instance manager 310 may represent an application cloud vendor that manages application instances applications. In one example, when managed by an application cloud vendor, "application 1" 316 and "application 1" 322 may each represent instances of an "application 1" and "application 2" 314 and "application 2" 320 may each represent instances of an "application 2". In one example, a second user may rent and pay for an application from an application cloud vendor through virtualization service 110, where the rented application is delivered through a virtualized environment including an application instance managed by instance manager. In another example, a same cloud vendor may manage both operating system instances and application instances through one or more instance managers.

In one example, in response to globalization meter interface 330 being called, globalization meter interface 330 may get, and buffer as globalization info data 332, a start time. In addition, globalization meter interface 330 may get, and buffer as globalization info data 332, the identifiers for one or more globalization characteristics visible for a current workload prior to data processing, including, but not limited to, the language, locale, and code set names. In particular, prior to starting data processing, the one or more globalization characteristics visible or accessible to globalization meter interface 330 may be permitted to access globalization characteristics readable from the metadata of the workload, such as a locale, where a locale may include one or more conventions including, but not limited to, a current format, a date and time format, and conventions based on regional regulations. In addition, globalization meter interface 330 may get, and buffer as globalization info data 332, an identifier for an OS instance and application called for a user workload and get the session ID for the current session. In addition, globalization meter interface 330 may track, and buffer as globalization info data 332, a number of inbound bytes accessed for data processing. In addition, globalization meter interface 330 may track, and buffer as globalization info data 332, during conversion of data 324 by one or more globalization services 126, identifiers for the language, locale and character sets processed during the conversion. In particular, by identifying the language, locale, and character sets processed during conversion, globalization meter interface 330 may add data to globalization info data 332 about which globalization characteristics were actually processed, such that if the globalization services are not enabled to handle a particular globalization characteristic in a workload, that globalization characteristic identifier is not included in globalization info data 332 for the session. In addition, globalization meter interface 330 may track, and buffer as globalization info data 332, a number of outbound bytes used for conversion during data processing. In addition, globalization meter interface 330 may get, and buffer as globalization info data 332, an end time. In one example, where globalization meter interface 330 gets information, the getting of information may require one or more of monitoring, tracking and extracting the information.

In one example, globalization meter service 114 may implement one or more components, including, but not limited to, a globalization tracking agent 340 for normalizing and aggregating globalization info data 332 from the buffer, for each session, into a normalized globalization usage record 344. In one example, globalization tracking agent 340 may represent an executable component added to globalization services 126, which may or may not be integrated into another service of globalization services 126 with globalization meter interface 330. In one example, globalization tracking agent 340 may monitor for buffered globalization info data 332 produced by multiple instances of globalization meter interface 330 and normalize and aggregate globalization info data 332 produced by the multiple instances of globalization meter interface 330 according to normalizing rules 346. In one example, globalization meter service 114 may run a separate instance of globalization tracking agent 340 for each instance of globalization meter interface 330 that is called. In one example, normalizing rules 346 may include one or more rules for normalizing the data collected in globalization info data 332 into a record format in normalized globalization usage record 344, which may include, but is not limited to, translating different types of identifiers in globalization info data records triggered by different types of application programming interfaces into normalized identifiers, computing total usage hours from start and end times, converting a total inbound and outbound number of bytes to a particular metric unit, and limiting and organizing the information collected in globalization info data 332 into normalized globalization usage record 344. In one example, to minimize the amount of data buffered as globalization info data 332 and to minimize the overhead required for getting and buffering data into globalization info data 332 at the same time that data is being processed, in one example, identifiers such as a current OS instance identifier, may represent an index in one format and normalizing rules 346 may specify a name or type of identifier to assigned to the index, such that globalization tracking agent 340, which may run after the data processing is completed, may normalize the index into a name or other type of identifier according to normalizing rules 346.

In one example, globalization tracking agent 340 may output normalized globalization usage record 344 according to output rules 348, which may identify storage locations, services, and layers to output to. In one example, a service provider of virtualization service 110 may specify one or more of normalizing rules 346 and output rules 348.

In one example, globalization meter service 114 may implement one or more components, including, but not limited to, a globalization based service meter 342. In one example, globalization based service meter 342 may receive the normalized globalization usage record 344 from each instance of globalization tracking agent 340 and may collect and output the data in one or more ways according to metering rules 358. In one example, globalization based service meter 342 may send the normalized and aggregated globalization info data directly to the user or to virtualization service provider, without any additional processing, by, for example, opening an interface directly to a user or virtualization service provider and sending the data through the interface, through sending the data directly to user accounts 118, and through sending the data to billing layer 113.

In another example, globalization based service meter 342 may, based on the normalized globalization usage record 344 collected from one or more sessions by one or more instances of globalization track agent 340, over a period of time, generate globalization usage data collected from one or more sessions that is categorized by one or more globalization characteristics and store the globalization usage data in one or more repositories of data process usage repositories 350, where the globalization characteristic categorization of the globalization usage data matches the globalization characteristic category of the particular repository. For example, data processing usage repositories 350 may include a repository 352 specified for a globalization characteristic of a "globalization category A", a repository 354 specified for a globalization characteristic of a "globalization category B", and a repository 356 specified for a globalization characteristic of a "globalization category C". In one example, each of "globalization category A", "globalization category B", and "globalization category C" may represent a different language or code set. In one example, metering rules 358 may specify the categories for the repositories and may also specify a default category repository.

In one example, globalization based service meter 342 may output the globalization usage data categorized in data process usage repositories 350 according to metering rules 358 to one or more users, through user accounts 118 or another interface, and may output the globalization usage data categorized in data process usage repositories 350 to billing service 113 or another service of virtualization service 110. In another example, a user or a service of virtualization service 110, such as billing service 113, may request to read categorized globalization usage data from data process usage repositories 350 and access selections of the data from one or more of the repositories.

In one example, by globalization meter service 114 tracking globalization based data processing metrics, at different stages, and enabling reporting and access to the metrics, a user or a service provider may receive updates, in real time, of the data processing usage overhead according to globalization characteristics of particular workload sessions. In addition, in another example, globalization based service meter 342 may organize the globalization usage data collected over a period of time in data process usage repositories 350 into a globalization usage table 360, according to metering rules 358, and send globalization usage table 360 to one or more services or users or allow one or more services or users to read globalization usage table 360. In one example, globalization usage table 360 may include a matrix of the globalization data processing usage metrics with the time and data usage specified for each globalization characteristic for each application tracked during a particular time period. By globalization meter service 114 collecting globalization data processing usage metrics during a particular time period into globalization usage table 360, a user or service provider may track metrics for all applications and globalization characteristics, over a particular time period, to determine and compare the actual overhead and cost of workloads according to the globalization characteristics of the workloads.

FIG. 4 illustrates one example of a block diagram of a globalization usage table including a matrix of the globalization data processing usage metrics with the time and data usage specified for each globalization characteristic tracked during a particular time period.

In one example, a table 400 may include data processing usage metrics collected over a period of time and distinguished by language, code set, operating system instance and application. In one example, the languages illustrated are a first language "lang A", a second language "lang B", and a third language "lang C". For each language, usage according to multiple code sets is tracked. For example, "set A", "set B", and "set C" are tracked for "lang A"; "set D", "set E", and "set B" are tracked for "lang B"; "set F" and "set B" are tracked for "lang C". In the example, the operating system instance and application illustrated are for "OS instance 1", metrics are tracked for each of "application 1" and "application 2" and for "OS instance 2", metrics are tracked for each of "application 1" and "application 2". In one example, for each language and code set, and then for each application, according to OS instance, a number of application (app) hours is tracked, a number of inbound bytes (in gigabytes (GB)) is tracked, and a number of outbound bytes (in GB) is tracked. In another example, other byte metrics may be tracked. In additional or alternate embodiments, additional or alternate languages, code sets, applications, and OS instances may be included in table 400. In addition, in additional or alternate embodiments, additional types of metrics and globalization characteristics may be included in table 400.

In one example, as illustrated in table 400, based on the globalization based data processing usage metrics collected, a user or service provider may determine the actual or effective cost of different workloads according to globalization characteristics of each workload. In one example, where the user or service provider applies billing metrics to the metrics in table 400, the user or service provider may determine the actual cost of different workloads. In one example, in determining the effective cost of different workloads, a user or service provider may compare the hours and data usage for different language, code set, application, and OS instance combinations to determine which types of workloads effectively cost more. For example, based on table 400, in comparing the workloads requiring "lang A" for "application 1" under "OS instance 1", those workloads requiring "lang A" and "set A" required more time and processed more data than the workloads requiring "lang A" and "set C", therefore workloads for "application 1" under "OS instance 1" requiring "lang A" and "set A" may have cost more than workloads requiring "lang A" and "set C". In another example, based on table 400, in comparing the workloads requiring "lang A" and "set A" for "application 1" under "OS instance 1" with the workloads requiring "lang A" and "set A" for "application 1" under "OS instance 2", those workloads under "OS instance 2" required more time and processed more data than those under "OS instance 1", therefore workloads for "lang A" and "set A" may have cost more under "OS instance 2" than under "OS instance 1".

Figure 5:
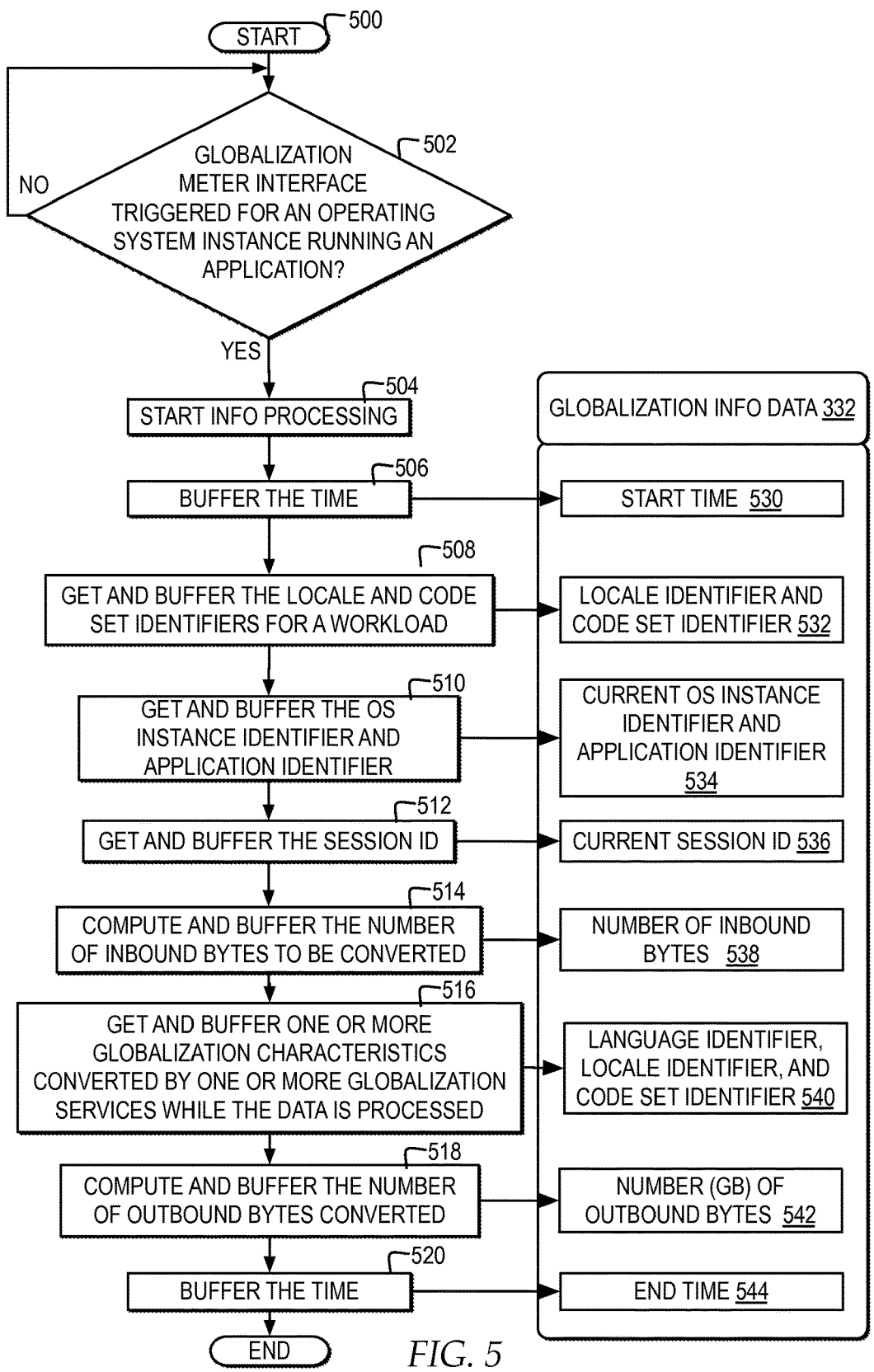
FIG. 5 illustrates one example of a high level logic flowchart of a process and program for tracking use of a virtualization service according to globalization characteristic based usage by triggering a globalization meter interface to track globalization info data.

FIG. 5 illustrates one example of a high level logic flowchart of a process and program for tracking use of a virtualization service according to globalization characteristic based usage by triggering a globalization meter interface to track globalization info data.

In one example, the process and program starts at block 500 and thereafter proceeds to block 502. Block 502 illustrates a determination whether a globalization meter interface is triggered for an operating system instance running in an application. In one example, the globalization meter interface may be triggered by a globalization service application programming interface at the operating system instance level, prior to handling any data processing function. At block 502, if a globalization meter interface is triggered for an operating system instance running in an application, the process passes to block 504. In the example, globalization info data 332 represents buffered data.

Block 504 illustrates starting information processing for the session. Next, block 506 illustrates buffering the time, as illustrated by start time 530, within globalization info data 332. Next, block 508 illustrates getting and buffering the locale and code set name, as for a first selection of globalization characteristics of the session workload that may be identified prior to data processing, as illustrated by locale identifier and code set identifier 532. In additional or alternate embodiments, the first selection of globalization characteristics may include additional or alternate characteristics. Next, block 510 illustrates getting and buffering an OS instance identifier and application name identifier, as illustrated by current OS instance identifier and application identifier 534. Thereafter, block 512 illustrates getting and buffering the session ID, as illustrated by current session ID 536. Next, block 514 illustrates computing and buffering the number of inbound bytes to be converted, as illustrated by number of inbound bytes 538. Thereafter, block 516 illustrates, while data is accessed from data 324 and processed, getting and buffering one or more globalization characteristics converted by one or more globalization services, as illustrated by language identifier, locale identifier, and code set identifier 540. Next, block 518 illustrates computing and buffering the number of outbound bytes converted, as illustrated by number of outbound bytes 542. Thereafter, block 520 illustrates buffering the time, as illustrated by end time 544, and the process ends.

Figure 6:
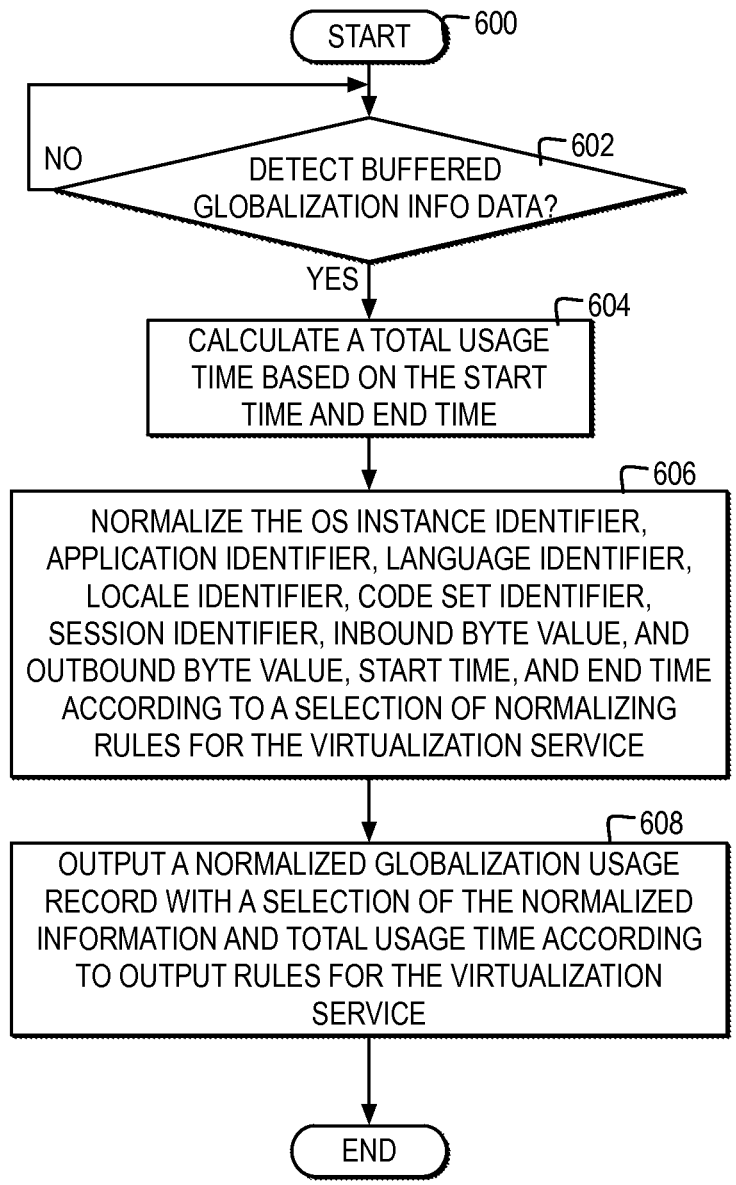
FIG. 6 illustrates one example of a high level logic flowchart of a process and program for tracking use of a virtualization service according to globalization characteristic based usage by normalizing globalization usage info tracked by a globalization meter interface.

FIG. 6 illustrates one example of a high level logic flowchart of a process and program for tracking use of a virtualization service according to globalization characteristic based usage by normalizing globalization usage info tracked by a globalization meter interface.

In one example, the process and program starts at block 600 and thereafter proceeds to block 602. Block 602 illustrates a determination whether a globalization tracking agent detects buffered globalization info data. At block 602, if the globalization tracking agent detects buffered globalization info data, then the process passes to block 604. Block 604 illustrates calculating a total usage time based on the start time and end time in the globalization info data. Next, block 606 illustrates normalizing one or more of the OS instance identifier, application identifier, language identifier, locale identifier, code set identifier, session identifier, inbound byte value, outbound byte value, start time, and end time according to a selection of normalizing rules for the virtualization service. Next, block 608 illustrates outputting a normalized globalization usage record with a selection of the normalized information and the total usage time according to output rules for the virtualization service to identify the overhead of data processing usage according to globalization characteristics, and the process ends.

Figure 7:
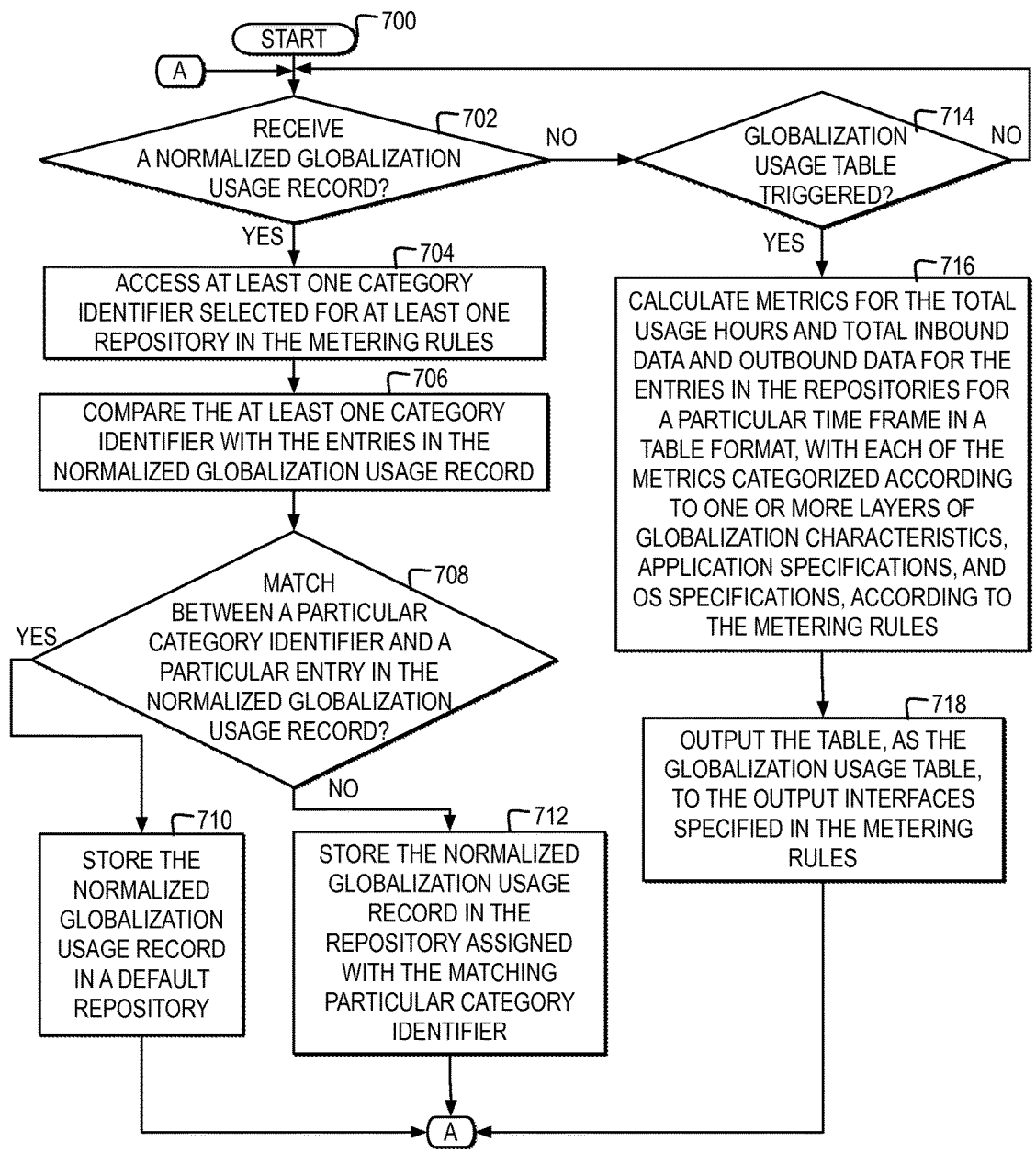
FIG. 7 illustrates one example of a block diagram of a high level logic flowchart of a process and program for tracking use of a virtualization service according to globalization characteristic based usage by collecting and organizing normalized globalization data into data repositories according to globalization characteristic and into a globalization usage table.

FIG. 7 illustrates one example of a high level logic flowchart of a process and program for tracking use of a virtualization service according to globalization characteristic based usage by collecting and organizing normalized globalization data into data repositories according to globalization characteristic and into a globalization usage table.

In one example, the process and program starts at block 700 and thereafter proceeds to block 702. Block 702 illustrates a determination whether a normalized globalization record is received. At block 702, if a normalized globalization record is not received, then the process passes to block 714. At block 702, if a normalized globalization record is received, then the process passes to block 704. Block 704 illustrates accessing at least one category identifier selected for at least one repository in the metering rules. Next, block 706 illustrates comparing the at least one category identifier with the entries in the normalized globalization usage record. Thereafter, block 708 illustrates a determination whether there is a match between a particular category identifier and a particular entry in the normalized globalization usage record. At block 708, if there is not a match between a particular category identifier and a particular entry in the normalized globalization usage record, then the process passes to block 710. Block 710 illustrates storing the normalized globalization usage record in a default repository, and the process returns to block 702. At block 708, if there is a match between a particular category identifier and a particular entry in the normalized globalization usage record, then the process passes to block 714. Block 714 illustrates a determination whether a globalization usage table is triggered. In one example, the metering rules may specify a particular time or set of conditions for triggered a globalization usage table. In one example, a globalization usage table may be triggered to report data in real-time, as normalized globalization usage records are received. In another example, a globalization usage table may be triggered in response to a user request. At block 714, if a globalization usage table is not triggered, then the process returns to block 702. At block 714, if a globalization usage table is triggered, then the process passes to block 716. Block 716 illustrates calculating metrics for the total usage hours and total inbound data and outbound data for the entries in the repository for a particular time frame, in a table format, with each of the metrics categorized according to one or more layers of globalization characteristics, application specifications, and OS specifications, according to metering rules. Next, block 718 illustrates outputting the table, as the globalization usage table, to the output interfaces specified in the metering rules, to identify the data processing usage overhead according to globalization characteristic, and process returns to block 702.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
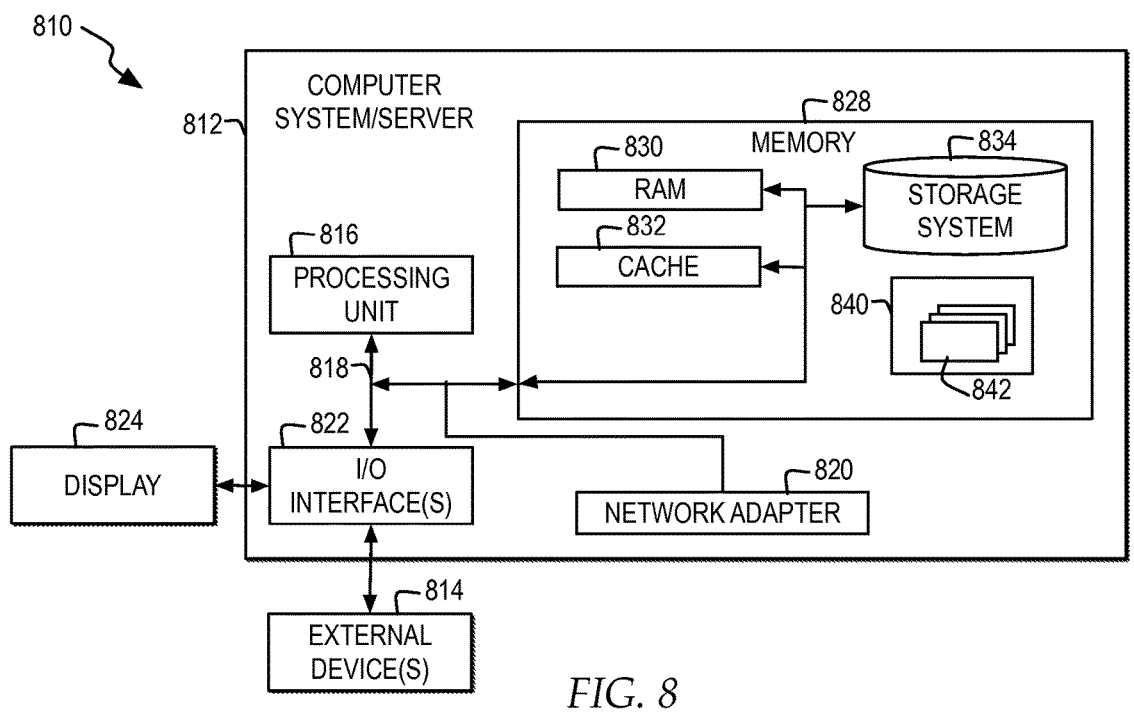
FIG. 8 illustrates one example of a block diagram of a cloud computing node, which may be implemented in a cloud computing environment.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 30 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
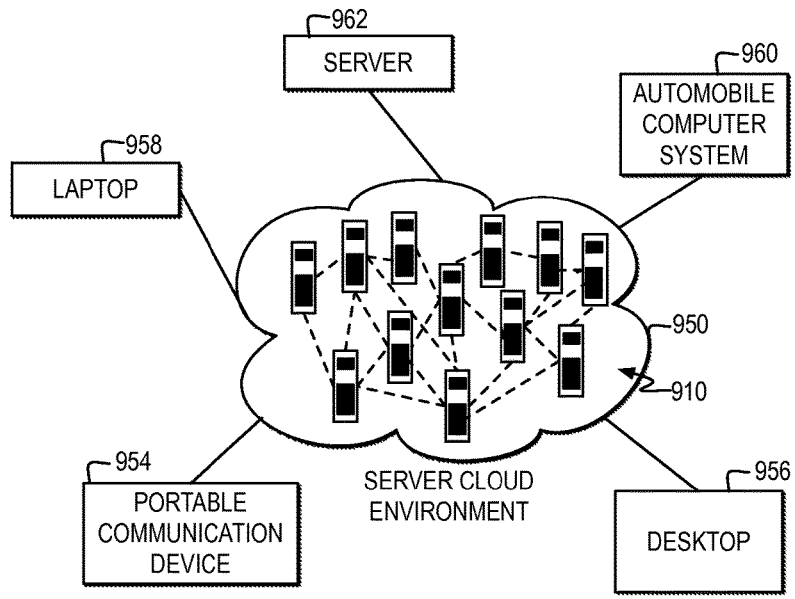
FIG. 9 illustrates one example of a block diagram of a cloud computing environment.

FIG. 9 illustrates a block diagram of one example of a cloud computing environment. In one example, a cloud computing environment 950 is representative of a cloud environment supported in FIG. 1. As shown, cloud computing environment 950 comprises one or more cloud computing nodes 910 with which local computing devices used by cloud consumers, such as, for example, personal communication device 954, which may include, but is not limited to, a personal digital assistant (PDA) or cellular telephone, a desktop computer 956, a laptop computer 958, automobile computer system 960, and server 962 may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices shown in FIG. 9 are intended to be illustrative only and that computing nodes 910 and cloud computing environment 950 can communicate with any type of computerized device over any type of network and/or network addressable connection (e.g., using a web browser).

Figure 10:
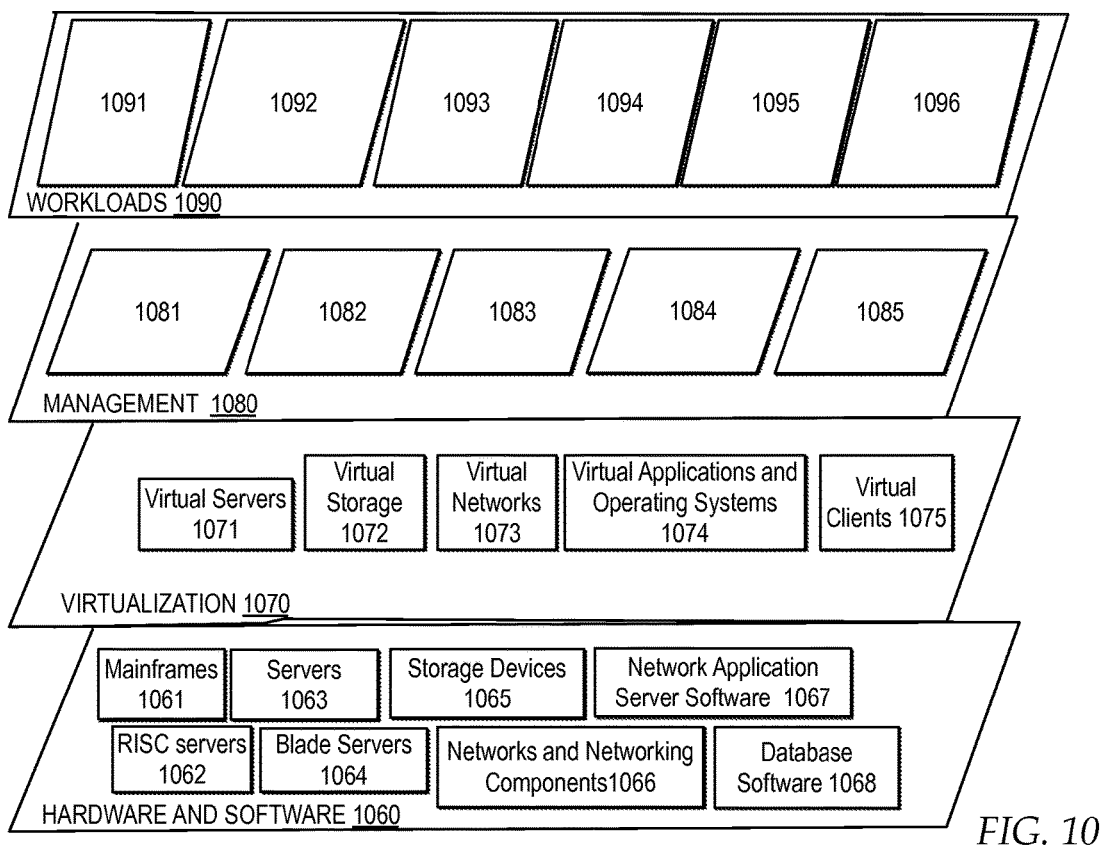
FIG. 10 illustrates one example of a block diagram of a set of functional abstraction layers provided by a cloud computing environment.

Referring now to FIG. 10, a set of functional abstraction layers provided by a cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer may include, but are not limited to: mapping and navigation 1091; software development and lifecycle management 1092; virtual classroom education delivery 1093; data analytics processing 1094; transaction processing 1095; and globalization tracking 1096. In one example globalization tracking 1096 may manage tracking of globalization based data processing usage metrics for processing workloads and manage reporting of the globalization based data processing usage metrics. Other server cloud functions may include one or more of the functions of virtualization service 110, management layer 112, billing service 113, globalization meter service 114, applications 120, platforms 122, infrastructure 124, globalization services 126, and globalization meter service components 128.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means tier implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for dynamically tracking usage of a virtualized environment, comprising:
a processor, coupled with a memory, and configured to perform the actions of:
receiving, at a virtualization service, a plurality of workloads, each of the plurality of workloads received comprising separate at least one globalization characteristics from among a plurality of globalization characteristics comprising language, cultural conventions, and code set conventions, each of the plurality of workloads received from a separate user from among a plurality of users associated with a particular account;
initiating tracking, by a billing service of the virtualization service, of data processing usage for the plurality of workloads submitted under the particular account, by tracking an overall usage metric of at least one virtualized environment comprising at least one application of a plurality of applications operating on an operating system layer hosted on at least one platform from among a plurality of virtualized environments;
during data processing of each workload within the at least one virtual environment, converting at the operating system layer the separate at least one globalization characteristic by at least one globalization service of a plurality of globalization services managed by a virtualization service provider of the plurality of virtualized environments, each of the plurality of globalization services requiring a separate amount of overhead during data processing based on a type of globalization characteristic, each of the plurality of globalization characteristics requiring separate amounts of computing resources within the at least one virtualized environment;

tracking, by a globalization meter service operating at the operating system layer, a separate globalization usage metric of the separate amount of overhead of the globalization service and at least one particular globalization characteristic processed during data processing of each of the plurality of workloads;

reporting, by the globalization meter service to the billing service, the separate globalization usage metric tracked for each of the plurality of workloads; and outputting, by the billing service, a bill for the particular account based on the overall usage metric for the particular account and separately identifying the separate globalization usage metric for each of the plurality of workloads to identify the separate amount of overhead during data processing per workload based on the at least one particular globalization characteristic processed.

2. The system according to claim 1, wherein the processor is further configured to perform the actions of:

initiating tracking, by a tracking application interface, by a code set converter library for the at least one globalization service called by the operating system layer, wherein the tracking application interface is integrated into the code set converter library.

3. The system according to claim 1, wherein the processor is further configured to perform the actions of:

initiating tracking, by a tracking application interface, by a message catalog handling application programming interface for the at least one globalization service called by the operating system layer, wherein the tracking application interface is integrated into the message catalog handling application programming interface.

4. The system according to claim 1, wherein the processor is further configured to perform the actions of:

buffering the identifier for the at least one particular globalization characteristic, the separate globalization usage metric, a start time when initiating tracking, and an end time when data processing is complete;

normalizing the buffered identifier of the at least one particular globalization characteristic, the separate globalization usage metric, the start time, and the end time into a normalized globalization usage record according to at least one normalizing rule; and accumulating a plurality of normalized globalization usage records tracked during data processing of a plurality of workload requests, into a plurality of repositories according to a separate globalization characteristic of each of the plurality of normalized globalization usage records, each of the repositories categorized by a separate globalization characteristic of the plurality of globalization characteristics.

5. The system according to claim 4, wherein the processor is further configured to perform the actions of:

calculating at least one separate accumulated usage metric of the at least one separate globalization usage metric from a selection of normalized globalization usage records from among the plurality of normalized globalization usage records according to the separate at least one globalization characteristic of the plurality of globalization characteristics, a particular operating system instance, and a particular application of the plurality of applications tracked with each of the selection of normalized globalization usage records;

creating a table comprising each at least one separate accumulated usage metric specified according the separate at least one globalization characteristic, the particular operating system instance, and the particular application;

outputting the table as the globalization usage data to at least one interface of the virtualization service provider.

6. The system according to claim 1, wherein the processor is further configured to perform the actions of:

tracking the overall usage metric comprising an amount of inbound data and an amount of outbound data into and out of the at least one virtualized environment during data processing of the workload request.

7. The system according to claim 1, wherein the processor is further configured to perform the actions of:

tracking the overall usage metric comprising a start time prior to data processing of the workload request in the at least one virtualized environment and an end time after data processing of the workload request at the at least one virtualized environment.

8. A computer program product for dynamically tracking usage of a virtualized environment, the computer program product comprising a non-transitory computer readable medium having program instructions embodied therewith, the program instructions executable by a processor to cause the processor to:

receive, at a virtualization service, a plurality of workloads, each of the plurality of workloads received comprising separate at least one globalization characteristics from among a plurality of globalization characteristics comprising language, cultural conventions, and code set conventions, each of the plurality of workloads received from a separate user from among a plurality of users associated with a particular account;

initiate tracking, by a billing service of the virtualization service, of data processing usage for the plurality of workloads submitted under the particular account, by tracking an overall usage metric of at least one virtualized environment comprising at least one application of a plurality of applications operating on an operating system layer hosted on at least one platform from among a plurality of virtualized environments;

during data processing of each workload within the at least one virtual environment, convert at the operating system layer the separate at least one globalization characteristic by at least one globalization service of a plurality of globalization services managed by a virtualization service provider of the plurality of virtualized environments, each of the plurality of globalization services requiring a separate amount of overhead during data processing based on a type of globalization characteristic, each of the plurality of globalization characteristics requiring separate amounts of computing resources within the at least one virtualized environment;

track, by a globalization meter service operating at the operating system layer, a separate globalization usage metric of the separate amount of overhead of the globalization service and at least one particular globalization characteristic processed during data processing of each of the plurality of workloads;

report, by the globalization meter service to the billing service, the separate globalization usage metric tracked for each of the plurality of workloads; and output, by the billing service, a bill for the particular account based on the overall usage metric for the particular account and separately identifying the separate globalization usage metric for each of the plurality of workloads to identify the separate amount of overhead during data processing per workload based on the at least one particular globalization characteristic processed.

9. The computer program product according to claim 8, further comprising the program instructions executable by a processor to cause the processor to:

initiate tracking, by a tracking application interface, by a code set converter library for the at least one globalization service called by the operating system layer, wherein the tracking application interface is integrated into the code set converter library.

10. The computer program product according to claim 8, further comprising the program instructions executable by a processor to cause the processor to:

initiate tracking, by a tracking application interface, by a message catalog handling application programming interface for the at least one globalization service called by the operating system layer, wherein the tracking application interface is integrated into the message catalog handling application programming interface.

11. The computer program product according to claim 8, further comprising the program instructions executable by a processor to cause the processor to:

buffer the identifier for the at least one particular globalization characteristic, the separate globalization usage metric, a start time when initiating tracking, and an end time when data processing is complete;

normalize the buffered identifier of the at least one particular globalization characteristic, the separate globalization usage metric, the start time, and the end time into a normalized globalization usage record according to at least one normalizing rule; and accumulate a plurality of normalized globalization usage records tracked during data processing of a plurality of workload requests, into a plurality of repositories according to a separate globalization characteristic of each of the plurality of normalized globalization usage records, each of the repositories categorized by a separate globalization characteristic of the plurality of globalization characteristics.

\* \* \* \* \*